July 24, 1951  J. C. MACFARLANE ET AL  2,562,052
COMMUTATED DYNAMOELECTRIC MACHINE
Filed July 29, 1947  5 Sheets-Sheet 1

Inventors
JAMES COLQUHOUN MACFARLANE
WILLIAM IAN MACFARLANE
By Otto Munk
Their Attorney

FIG.5.

July 24, 1951  J. C. MACFARLANE ET AL  2,562,052
COMMUTATED DYNAMOELECTRIC MACHINE
Filed July 29, 1947  5 Sheets-Sheet 3

Patented July 24, 1951

2,562,052

UNITED STATES PATENT OFFICE 2,562,052

COMMUTATED DYNAMOELECTRIC MACHINE

James C. Macfarlane and William Ian Macfarlane, Glasgow, Scotland

Application July 29, 1947, Serial No. 764,358
In Great Britain May 3, 1945

9 Claims. (Cl. 171—252)

This invention relates to direct current dynamo-electric machines of the type having armature-reaction compensation, and a laminated field core.

Certain disadvantages exist at present in the ordinary salient pole dynamo-electric machine, and also in the ordinary dynamo-electric machine with a laminated stator field structure having a separate interpole winding in special slots. Briefly enumerated these disadvantages are:

On salient pole non-compensated machines:

(a) Distortion of the field by armature reaction causing voltage drop on load and requiring a greater m. m. f. on the field on load.

(b) Interpoles must be wound to balance the whole armature m. m. f. before adding the additional m. m. f. required for commutation.

On laminated field, compensated machines of ordinary construction:

(c) Special slots are required to provide space for the additional ampere turns required for commutation when using a full span armature winding.

(d) More ampere turns are required for commutation than are necessary with our invention because of the peaked armature m. m. f., immediately under the interpole, as will be hereinafter explained.

It is an object of this invention to provide a dynamo-electric machine in which these disadvantages are eliminated or mitigated.

It is a further object of the invention in a machine in which the first mentioned object is attained to utilise its properties to obtain control of the output of the machine in response to variations of flux on the interpole axis.

A further object is to enhance the effect of the change of interpolar field on the output of the machine so that the controlling powers required may be small.

A further object is to obtain this control during transient load changes only so that the normal commutating process is not upset during static load running.

A further object is to provide special means for continuous, that is non-transient, control from alteration of the interpolar axis field without interfering with the normal process of commutation.

Further objects of the invention will appear from the description following hereafter.

It is not an object of our invention to improve the commutation of the machine by these variations of field. The normal precautions for good commutation are observed, while the additional fields control the output of the machine within the limits of good commutation.

By this invention the armature coils are shorter than normal so as to give a substantially flat topped armature m. m. f. (magneto motive force) characteristic, while the field slots are uniformly and continuously disposed of laminated material. The compensating winding in the field slots has the inner turns (at the mid points of the interpolar spaces) wound in adjacent slots, while the outer turns span approximately 180 electrical degrees, thus giving a peaked form to the compensating m. m. f., the difference in m. m. f. between this peak and the substantially flattened top of the armature m. m. f. being sufficient to produce the reversing flux necessary for commutation without the necessity of over-compensation. The axis of the magnetizing windings is 90° from that of the compensating winding, and the outer conductors of the magnetising winding span less than 180 degrees in order to leave a suitable commutating zone opposite the brush. For small or medium machines only 3 to 8% of the armature reaction m. m. f. is needed for satisfactory over-compensation. Preferably the armature coils short-circuited by the brushes and under the influence of the interpolar field inject into the main poles of the machine very considerable magneto-motive-forces due to those produced in the interpolar axis. This injected m. m. f. is used for control, so that under changes of control circuit conditions currents flow in the coils short circuited by the brushes in the desired direction to raise or lower the voltage of the machine.

The present invention enables the interpolar field to be protected and its effect enhanced greatly without increasing the ill effects of such control fields on commutation. This also allows small airgaps to be used and makes the machine stable over a very much greater range of magnetic/electric load ratios. By correct proportioning the main field is very weak relative to the armature. The ratio of strength of the two fields as compared with the conventional machine may be of the order of 4:1. The commutation zone may easily be varied in width by winding the armature with an appropriately short span and the compensating winding having one or more slots blank at the interpolar axis. The controlling windings may be more easily accommodated in the existing slots than in the conventional full span armature machine.

The machine may have any number of poles suitable to design requirements, and as controlling currents circulate only in the coils undergoing commutation, all the armature coils between the brushes are used for power output. Thus by effectively varying the width of the brushes, the ratio of the controlling part of the armature to the output part may be altered. The control windings, correctly proportioned to the output windings, yield a machine of little over normal size.

In the present invention circulating currents are induced in the short circuited coils to effect change of flux, so that they cause rather than result in flux change. The desired conventional windings on the magnetising axis have the outermost conductors of the pole winding short of the commutating axis by a sufficient number of slots to give a suitably wide interpolar space for commutation, that is the outermost conductors span less than 180 degrees.

Compensating winding is at right angles and connected in series with the armature circuit. It has its outermost conductors arranged in slots near the magnetizing axis, that is, covering approximately the full span between centres of the main poles, and its innermost conductors are wound in adjacent slots on the commutating axis. The armature has shorter coil span than usual to give a m. m. f. characteristic of triangular shape, with the apex cut off. The term "short span," and the type m. m. f. characteristic obtained thereby, are well known in the art.

In order that our invention may be properly understood we append herewith by way of example, explanatory drawings wherein.

Figure 1:
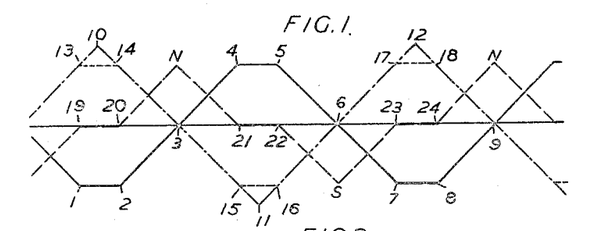
Fig. 1 shows the diagram, developed out flat, of armature m. m. f. resulting from the shortened span of the armature coils and the peaked m. m. f. due to the full span compensating winding, wound right to the centre, together with the m. m. f. characteristic of an appropriate field winding.
Figure 2:
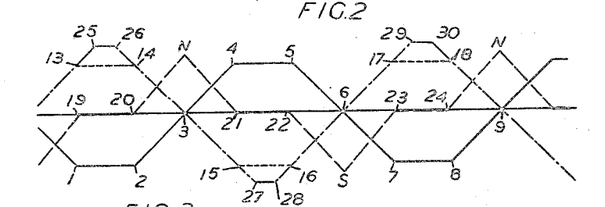
Fig. 2 shows a similar diagram but with the characteristic of the compensating winding flattened owing to the centre turns of the compensating winding spanning one slot. The compensating winding balances the armature winding at all positions away from the commutating space.

In considering the characteristics shown in Fig. 1 and Fig. 2, it should be clearly understood that these V-shaped figures with straight sides are only obtainable with windings distributed continuously over a smooth core. With a toothed core the m. m. f. characteristics will have stepped characteristics, the m. m. f. increasing or decreasing step by step as the winding steps from slot to slot, but since in any case the slot leakage will tend to smooth out the steps of actual flux resulting from the stepped m. m. f., there will be no appreciable error in assuming that the V-shaped characteristics have straight sides, as shown in these diagrams. We therefore, for simplicity, show the characteristics as straight sided V's with or without flattened tops.

In a compensated machine with laminated field structure as ordinary designed, the armature and compensating characteristics will be sharp pointed V's directly opposing one another, but with the addition of a further m. m. f. on the tooth or teeth surrounded by the additional interpole ampere turns. This construction brings about the disadvantages already enumerated.

In our invention we avoid the necessity for providing these additional interpole ampere turns by winding the armature of shorter span than normal, thereby cutting off the peak of armature m. m. f. at the interpolar area, while retaining the full compensating coil as herein more fully described. This results in the m. m. f. of the compensating coil being in excess on the commutating axis by an amount just sufficient to give the necessary ampere turns for commutation.

Referring to Fig. 1, the heavy line characterised 1—2—4—5—7—8 is the armature m. m. f. of an armature with short span coils, while the chain dotted characteristic 10—11—12 is the characteristic of the compensating winding, balancing out the armature m. m. f. at all points except at the neutral zone where it exceeds the m. m. f. of the armature winding, as shown by the line 15—16 for instance, which is the armature m. m. f. 4—5 projected over to show the greater m. m. f. of the compensating winding at point 11. In other words, the difference E. M. F. shown by point 11 and the line 15—16, representing the armature m. m. f. is the m. m. f. available for commutation.

The characteristics of Fig. 1 would be suitable for a machine with fixed brush positions.

The characteristic 20—N—21—22—S—23—24 is the field characteristic, the outer coils of the field winding being of short enough span to provide a neutral space 21—22 or 23—24 on the commutating axis. This space must be wide enough to allow the shortened coil under commutation to be entirely outside the main field while under the brush.

Fig. 2 shows a similar set of characteristics suitable for a machine where a limited movement of the brushes, as for instance in a motor where a small amount of brush adjustment is necessary to correct the speed, or where a wide brush or split brush is used for control purposes as hereinafter explained.

The inner turns of the compensating winding span over one slot, which is left blank, thereby giving the flat topped characteristic 25—26—27—28. The armature characteristic is 1—2—4—5—7—8 and the coil span has been adjusted to give the flat top 4—5 which gives the commutating m. m. f. represented by the difference in height between 15—16 and 27—28. At all other points the compensating winding balances the armature. For practical purposes the innermost turns of the compensating winding would not span more than one blank slot.

It should be understood that for the sake of clearness the differences between the characteristics have been much exaggerated and in a practical machine it would not be necessary to flatten the characteristics as much as is shown. In such a machine with fixed brush position (as in the case of Fig. 1) the actual span of armature coil may be about 99% of full span.

Figure 3:
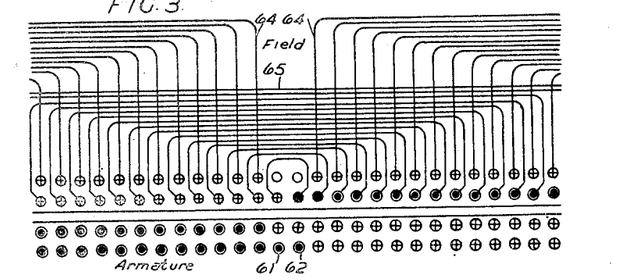
Fig. 3 shows the distribution of current in the armature conductors resulting from the short span winding, with compensating coil wound to the centre, as for Fig. 1.
Figure 4:
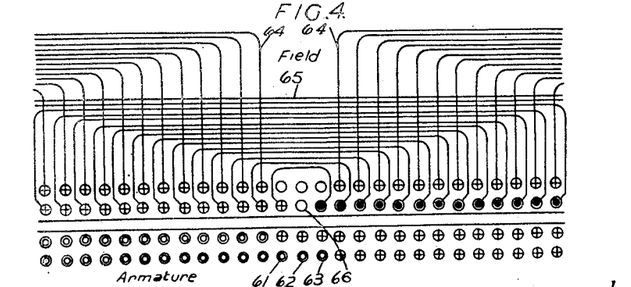
Fig. 4 shows the distribution of current in armature and compensating windings as in Fig. 3, but with the compensating winding spanning one slot.

In Figs. 3 and 4, we show how the flattening of the armature coil span brings about a flattened m. m. f. characteristic. In armature slots 61 and 62 in Fig. 3, and 61, 62 and 63 in Fig. 4, it is shown that the short span winding causes the currents in the top and bottom conductors in these slots to cancel one another out, as already described, thereby adding nothing to the armature m. m. f. The total number of slots in Figs. 3 and 4 is of course greater than 24 as in the example already given. In Fig. 3, the inner turns of the compensating coil 65, span one tooth, thereby giving a peak of m. m. f. corresponding to the diagram Fig. 1, whereas in Fig. 4, the inner turns of the compensating winding, 65, span two teeth—slot 66 being left blank giving a characteristic somewhat as shown in Fig. 2, although with a toothed construction the V-shaped m. m. f. characteristics will naturally have stepped sides.

In Figs. 3 and 4 the field winding, 64, is of short span as regards its outer coils, by an amount sufficient to prevent the coil under commutation from cutting the main flux as shown at 21—22 on Fig. 1 and Fig. 2. Since the field windings are of short span as regards the outer coils two half slot spaces 31 left on the interpolar axis may be used to accommodate the control circuit windings as shown in Figure 5.

In addition to the advantages set forth above, the field structure of a machine made to our invention can be built up with core plates having equal and uniformly spaced slots not requiring special dies for punching.

Figure 5:
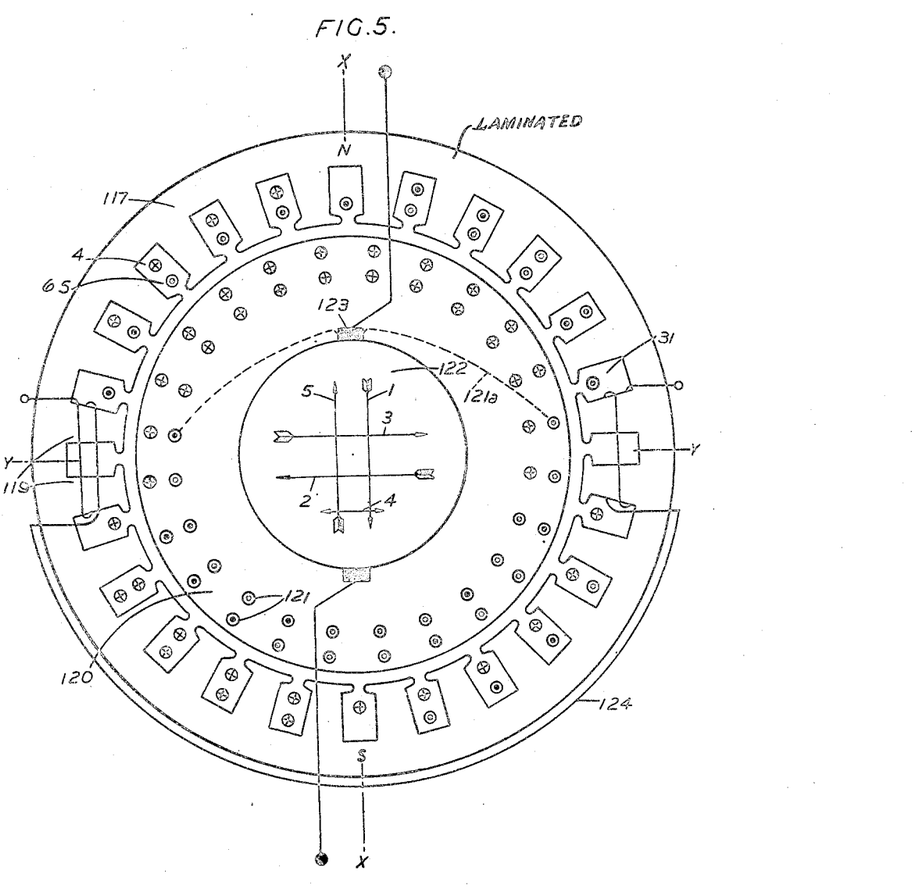
Fig. 5 is a diagrammatic view of a 2 pole dynamo machine of the type described and adapted for the modified form of the invention this, however, being typical also for a multi-pole machine.

In Figure 5, the stator or field structure 117 is of the laminated, non-salient pole type, having field 64, and compensation windings 65, and interpoles 119. The armature 120 carries windings or coils 121 and commutator 122 having brushes 123 connected to the main circuit. X—X represents the main field axis and Y—Y the interpolar or cross field axis. Arrow 1 shows the direction of the main field m. m. f.; arrow 2 that of the armature reaction m. m. f.; arrow 3 that of the compensating m. m. f.'s; arrow 4 that of the control coil m. m. f.'s; and arrow 5 that of the short-circuited coil m. m. f.'s.

The coil 121a short circuited by brush 123 is seen to be under the influence of the flux of the interpoles 119, as must be the case since the function of the interpole is to help commutation. The flux produced by any current flowing in the short circuited coils is seen to be in the main axis (arrow 5), that is, either opposing or adding to the main flux. Thus the effect of any small currents applied, say, to a representative interpole control coil circuit as shown at 124, would be to vary the flux in which the short circuited coil is moving and hence to vary the E. M. F.'s induced in the coil. This E. M. F. has only to balance the resistance drop of the short circuited coil so that very large currents may flow transiently producing large m. m. f.'s to add to or oppose the main polar m. m. f.

The controlling m. m. f. on the interpole may be produced in a variety of ways depending on the function which the machine has to fulfill, but normally the machine will be wound in such a way that if a definite new main field condition is required to compensate for, say, a change in load, then this can be obtained from the usual main polar windings without aid from the short circuited coil, because with constant main field winding resistance the voltage or current rise through the winding is in linear proportion. Such main field windings may be series, shunt, or separately excited windings either alone or in any combination. The effect of the controlling m. m. f. and short circuited coil, however, will, with proper connections, be to boost up the change to the new conditions, making the change very rapid and positive in action. If however, it is required to produce a steady, as distinct from a transient, controlling effect from the action of the short circuited coils, it may be necessary to adopt methods to reduce the flow of the short circuited coil current across the brush face. Such methods are considered later.

The half slots 31 shown in Figures 3, 4 and 5 are suitable for the accommodation of the control circuit windings.

Figures 6, 7:
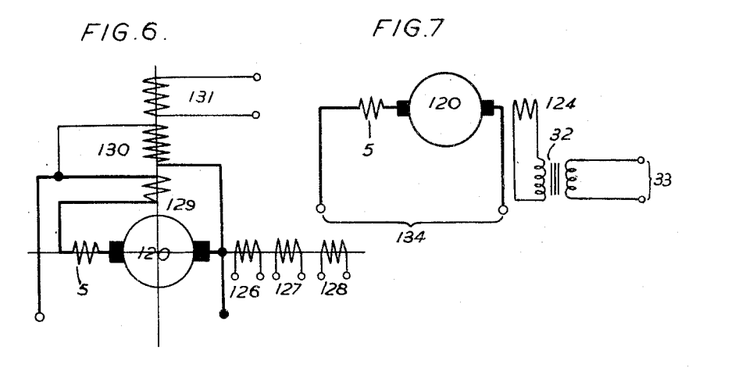
Fig. 6 shows the various types of winding which may be used on the machine.
Fig. 7 shows an arrangement in which an injector transformer feeds the controlling coil.

Figure 6 shows the various types of winding which may be used on the machine, although they would of course not normally all be used at once. In this diagrammatic sketch the convention is adopted of showing the brushes as if they lie directly on the armature conductors; that is, they lie on the interpolar or cross axis Y—Y. On this axis also are shown compensating windings 65 and a number of control windings indicated diagrammatically at 126, 127, 128. Series 129, shunt 130, and separate, excitation windings 131 are shown on the main polar axis X—X.

Although any number of control windings can be used certain preferred connections will be considered.

When the machine is compounding up, sudden changes of load may cause a dip in the terminal voltage. This can be corrected by an increased main polar flux obtained by transient reaction from the coils under commutation. One of the following means may be used to get this increase:

(a) Fig. 7 shows an injector transformer 32 operating on a small coil 124 on the interpole teeth, coupled so that when the current of the control circuit 33 varies suddenly a transient current is induced in or "fed back to" the small auxiliary interpole coil 124 in the control circuit and which increases the flux in the pole momentarily. As a result a transient increase occurs in the main output circuit 34. The main windings (if any) are not shown in this figure.

Figure 8:
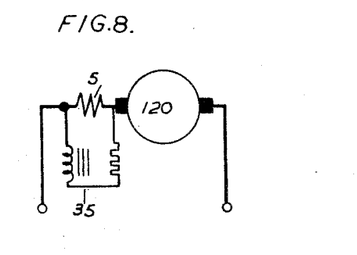
In Fig. 8, the provision of separate controlling coils is avoided by diversion of part of the main current past the compensating winding through an inductive divertor.

(b) Fig. 8. A similar effect may be obtained without the use of separate controlling coils by diverting part of the main current past the compensating winding 65 (which is wound so as to balance the armature with such reduced current) and through a divertor 35 having a greater inductance than that of the compensating winding. Then, for a sudden increase in load due to the greater delay in building up the current in the divertor circuit as compared to the compensating winding circuit, caused by greater divertor inductance momentarily there is a proportionally greater current flowing in the compensating winding. That is, the compensating winding momentarily produces a proportionally greater m. m. f. than the armature, thus producing the necessary flux under the interpole to cause the short circuited coils to act as required. Instead of the whole compensating winding being diverted it may be more suitable to divert only the turns of the compensating winding which encircle the interpolar teeth.

For machines which require a drooping characteristic, that is the voltage building down with increase of current, the opposite effects are required. These may be obtained in the following ways:

(c) An injector transformer may be used as in (a) and Figure 7 above, but with the transformer connected so as to inject into the control coil a current which will produce a reduced flux under the interpole when the load or output current suddenly increases.

Figure 9:
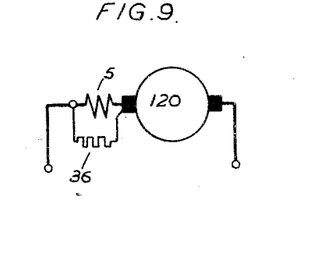
In Fig. 9 a divertor is also utilised but in this case it is a non-inductive resistance.

(d) Fig. 9. The compensating winding 65 is used by overwinding and diverting, this time with a non-inductive resistance 36. Then a sudden increase in load or output current will pass momentarily mainly through the divertor and the compensating winding will momentarily be relatively weaker than the armature, consequently the reduction (or reversal) or interpolar flux will cause the short circuited coil to build down the main flux and hence the voltage.

Figure 10:
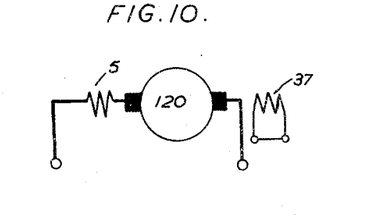
In Fig. 10 the controlling coil consists of a "shading" coil.

(e) Fig. 10. The control coil may consist of a "shading" coil 37 which surrounds the interpolar tooth and is short circuited on to itself as shown. A sudden change of current, say from full value to zero, will cause a current to circulate in the shading coil which opposes the change and gives m. m. f. to build up the voltage, and vice versa.

Figure 11:
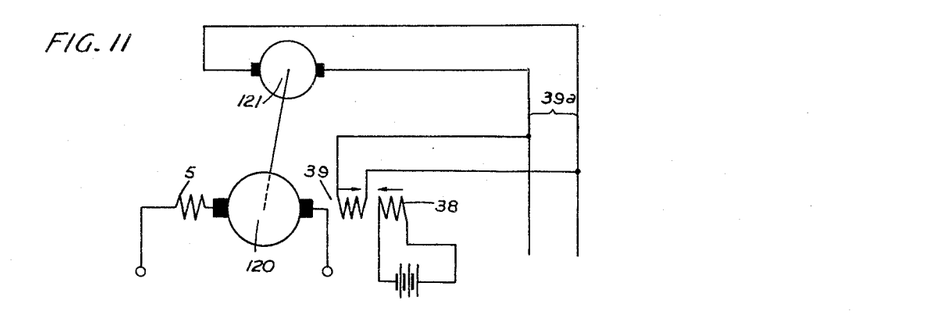
In Fig. 11 two opposing control coils are used, one acting as an "abutment" against the other.

Then it is required that an electrical quantity in the circuit being controlled should be held substantially constant, for example, voltage, current, power factor, this may be done as follows:

(f) Fig. 11. Two control coils may be used, one of which 38, is separately excited from a constant voltage source, for example, a battery, or by a rectifier from an A. C. supply circuit, the other 39 deriving its voltage from the circuit 39a to be controlled and wound so as to oppose said first coil 38. The first may be said to be an abutment coil against which the other coil acts. Any variation in current in the circuit to be controlled causes a deviation from constant voltage across the control coil 39, or a feed back of current in one direction, and gives a resultant m. m. f. at the interpole causing the short circuited coils to act in the required way to vary the output in response to said variation.

Figure 12:
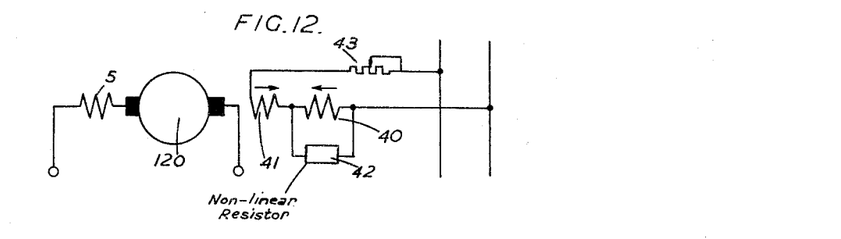
Fig. 12 is a modification of Fig. 11 in which two opposing control coils are in series, but one acts as an artificial abutment coil by shunting a non-linear ceramic resistance thereon.

(g) Instead of using a separate abutment coil supply as indicated in Fig. 11, an "artificial" abutment may be used, for example, a circuit including a resistance known in the trade as a "non-linear" ceramic resistance, referred to in British Patent specification No. 566,168 (Macfarlane) (Figs. 9 and 9A), the resistor being made in known manner of any of certain silicon carbide ceramic materials the effect of which is that its resistance reduces with increase of applied voltage. This is shown diagrammatically in Fig. 12 where the control coils 40, 41 again oppose one another, the coil 40 being shunted by a non-linear ceramic resistance resistor 42, as aforesaid, and acting as an abutment giving a much less than proportional increase of m. m. f. while the series opposition 40 coil gives a much more than proportional decrease of m. m. f. (that is, its m. m. f. is more than proportionally increased but in the reverse direction), (or vice versa). The result is a decrease (or increase) of m. m. f. again causing the short circuited coils to act. A regulator is provided at 43.

Figure 13:
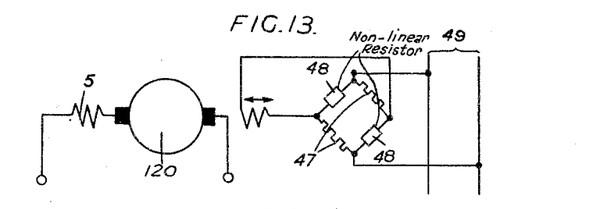
Fig. 13 shows a modification of Fig. 12, in which an artificial abutment coil is provided as a bridge circuit.

(h) A further form of artificial abutment may be used such as the bridge circuit, see Fig. 13, where alternate arms of the bridge are linear 47 and non-linear 48 resistors. The circuit 49 to be controlled is connected across one diagonal of the bridge and a control coil 50 across the other diagonal. For normal voltage in the controlled circuit the bridge is balanced and no current flows in the control coil, but when the voltage across the controlled circuit varies the bridge goes off balance and current flows to alter the m. m. f. in the interpole.

Figure 14:
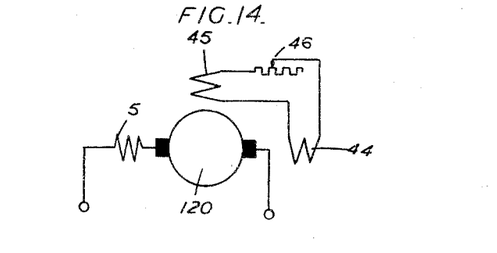
Fig. 14 shows an arrangement in which the control winding has in series therewith a second winding on the main poles of the machine.

(j) A further type of winding may be used to produce either (1) more rapid response of the machine or (2) increased stability and freedom from oscillation. This is shown in Fig. 14 and consists of a winding 45 on the main poles of the machine connected to a control winding 44 (on the interpole axis) in the manner shown. Then any change of flux through the main poles will produce by transformer action a voltage across the winding on this pole which will cause a current to flow round the circuit and through the control winding on the interpole. Depending on the relative polarities of the main and interpole windings the control winding will either assist or oppose the change of main flux. If the control winding polarity is such as to assist the change of main flux object (1) is attained. If it opposes the change the action of the machine is slower and more stable (object 2). A resistance 46 may be included in this circuit in order to control its speed of response to load changes as shown in Figure 14.

Figures 15, 16, 17, 18:
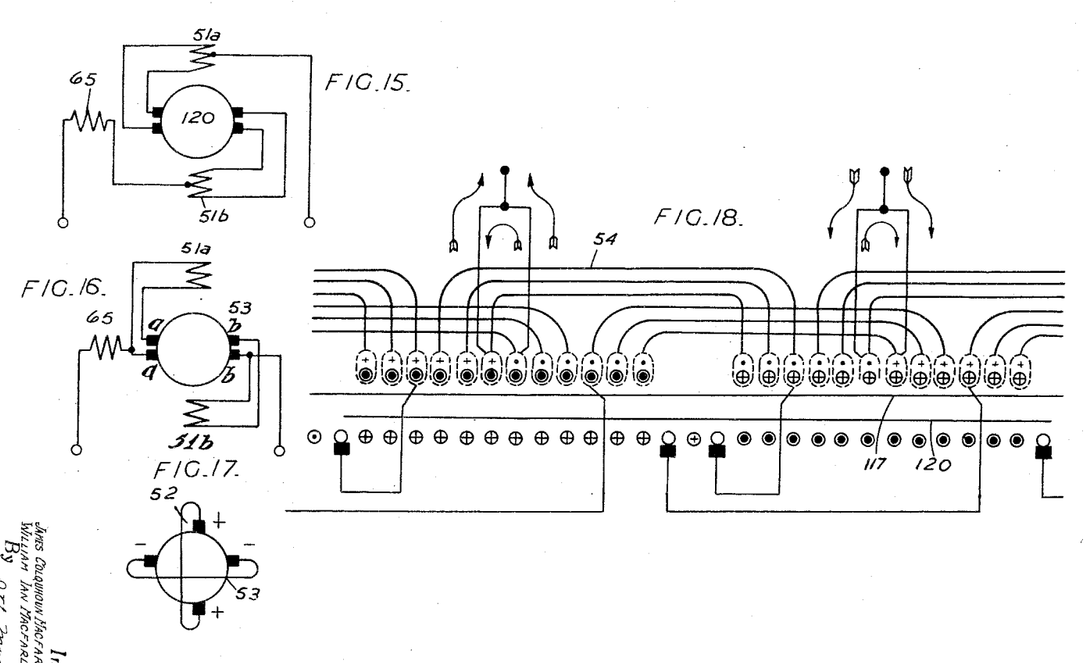
Figs. 15, 16, 17 are diagrams illustrating modifications of the invention as applied to cases where continuous or non-transient control is required.
Fig. 18 is a diagram of a further modification where continuous or non-transient control is required.

In the machines considered in Figs. 7 to 14 above, the function of the controlling flux at the interpole has been to effect adjustments of a transient nature which, since it alters the value of the interpole flux may tend to cause commutation troubles, but as has been pointed out previously, these troubles need not be any worse than that caused by other methods of forcing the field flux to new values. When, however, a continuous or non-transient control is required from the interpole it may be necessary to reduce the effect of the cross brush current, that is, the current in the short-circuited coils. This may be attained by splitting the brush into two parts insulated from one another, as shown in Fig. 15. Then the link joining the two half brushes carries the cross brush (i. e. short circuited coil) current and this link may be wound round the main pole to form auxiliary windings 51a, 51b which act in the same direction as the short circuited coil to assist its action. Less current is then required in this circuit to produce the same effect. This method also helps to reduce the effect of the voltage drop of the brushes on the cross brush current.

Since the main current passes to the halves of each brush, half of this current must pass through the link. In order to neutralise the effect of this current on the magnetisation the main current may either be led into the middle of the link windings 51 as in Fig. 15, or into the leading and trailing half brushes respectively of brushes of opposite polarity as shown in Fig. 16. In the latter case the half of the main current passing into brush aa passes through coil 51a, while half that passing out of brush bb passes through coil 51b, and the effects of these currents are again to neutralise one another on the main poles. In both cases the effect of the main current is neutralised.

When machines with more than one pair of main poles are used, as would be usual, then by using series wound armatures and offsetting the brushes it is not necessary to use split brushes; the same number of brushes as poles being used. This is shown in Fig. 17, for a four pole machine the two brushes of similar polarity being offset to the same side of the neutral axis as shown, so that one acts as a leading, the other as a trailing, half brush. Again the windings may be connected in links 52, 53 as shown in Figs. 15 and 16.

To avoid the necessity of carrying the main current through the windings 51a and 51b the compensating windings may be wound in the cross brush link in such a way as to act also as a main polar winding assisting the short circuited coil. This arrangement is shown diagrammatically in Figure 18. The main leads are split and carried through compensating windings which are wound to span from one side of the centre line of one pole to the corresponding side of the next (i. e. leading side to leading side). The half main leads are then carried to the halves of the split brushes. The half main currents are arranged in the windings to compensate the armature, and the cross brush currents are arranged to assist the short circuited coil by assisting or opposing the main field winding, thus reducing the cross brush currents. Compensating windings wound in the cross brush link are indicated at 54, U—U and W—W representing the centre lines of N and S field poles respectively, the field structure 117 and armature 120 being shown developed out flat. The main field and control circuit are not shown. In the field structure conductors the lower symbol represents half the main current ½, and the upper symbol represents the cross-brush current Ic, both flowing in the same conductor. It should be noted that although in Figure 18 the main and cross brush currents are shown as flowing separately in the compensating windings; in fact the actual current will be the sum or difference of the currents as the case may be. The cross brush currents will be reduced in the ratio of the short circuited turns per pole to the compensating turns per pole. A normal reduction will be to about one fifth of that obtained when the short circuited coils act alone.

In both the above modifications referred in relation to Figs. 15 to 18 the main and control windings may be of any of the types previously considered.

Trouble may be experienced in machines of the above types when they are controlling separate circuits due to undesirable electrical oscillations in the load or output circuit. Various means may be used to damp out these oscillations which are caused by the mutual inductance of the various windings on the interpolar axis. As an example of this the abutment circuits (f) and (g) referred to above may cause oscillations due to the effect of the mutual inductance between the abutment and opposition windings. A sudden rise, say, of current in the opposition winding causes a corresponding rise of current in the abutment winding by transformer action. The correction of this causes a reversal of the effect and an oscillation is produced in the abutment circuit. Various methods may be employed to damp out or prevent these oscillations.

The general method of eliminating the tendency to oscillate is to provide mutual inductance between the coupled circuits, of the same value and time constant as that in the machine between the windings causing oscillation, but of the opposite sense so as to cancel out any transformer effects between the windings. For example, if the two windings in the machine are of such a relative polarity that a sudden rise of current in one causes a momentary rise of current in the other then the mutual inductance of the external coupling should be such that a rise of current in the first winding causes a corresponding fall in current of the second.

One means of providing such an external mutual inductance is by the use of an injector transformer having primary and secondary windings, each in series with one of the windings causing oscillation and with the polarities of these windings arranged to cancel the internal transformer effects between the coils.

When the abutment and opposition circuits (f) and (g) are used, elimination of oscillations may also be obtained by damping the abutment winding circuit with series resistance or free inductance in the form of a reactance coil. Alternatively, magnetising coil means may be used on the interpolar axis to balance the transient change in m. m. f. of the abutment or reference winding, said means being excited from a suitable source to give the required transient m. m. f. For example, said means may be excited from the secondary of an injector transformer of the type shown in Figure 7, the primary being energized from the circuit causing the oscillation. When the oscillation is caused by inter-action of the load and control circuits the abovementioned circuit (j) and shown in Fig. 14 above may be used, the polarities being arranged so that the magnetising coil means on the interpolar axis opposes the change in the control circuit.

A further method is to use a shading coil as in (e), Fig. 10. The change of flux on the interpolar axis causing the abutment m. m. f. to be changed also causes by transformer action a current to flow in the shading coil which transiently opposes the change, thus preventing oscillation.

Whether the simple or one of the modified forms of the machine is used will depend on the particular application. Uses of the modified forms of machine may be for example, a rapidly acting exciter for a generator or motor, giving an immediate and strong injection of correcting power into the field winding of the main machine when activated by a comparatively small change of voltage or current in the main circuit; a constant voltage variable speed generator; a generator giving constant current with variable voltage; a drooping characteristic generator capable of being adjusted to give various types of drooping characteristics, with very fast recovery characteristics suitable for an arc welding supply. As an exciter it can be used to control the output of a larger machine to give any desired characteristic. Alternatively the machine may be used as an amplifier to produce large powers from small control signals for any desired purpose. A generator according to our invention can be put to these uses and also to other uses by variations in the type of field windings (shunt; series; separate excitation; combination of these; or other combinations described in this specification); or by variations in the radial length and shape of the airgaps under the various polar projections, including taper airgaps; or by variations in the degree of magnetic saturation in these polar projections. The machine may also be used as a motor controlling, say, its own speed; or, for example, a constant speed motor for cranes or winches. In such case, referring, for example, to Figs. 11, 12, or 13, where level compounding is obtained, a small generator is driven by the motor 120 and supplies the circuit 39a.

We claim:

1. A direct current dynamo electric machine of the type provided with an armature wound with coils and provided with commutator and brushes, a laminated field structure presenting poles and having conductor receiving slots arranged uniformly and continuously therearound, main polar windings, and a series compensating winding wound in the slots of said laminated field structure, the m. m. f. of the compensating winding opposing the armature m. m. f., and the respective axes of these two windings being 90 electrical degrees apart, wherein the span of the armature coils is shorter than normal so as to give a substantially flat topped armature m. m. f. characteristic, the inner turns of the compensating winding, at the mid-points of the interpolar spaces are wound in adjacent slots, and the outer turns span approximately 180 electrical degrees, so as to give a peaked form to the compensating m. m. f., the relative size of these turns of the compensating winding being so chosen that the difference in m. m. f. between said peak and the substantially flattened top of the armature m. m. f. is sufficient to produce the reversing flux necessary for commutation, without any necessity of over-compensation.

2. A direct current dynamo electric machine according to claim 1, in which the innermost turns of the compensating winding span one unwound slot whereby to provide an interpolar space to allow brush movement.

3. A direct current dynamo electric machine according to claim 2, also including additional control means responsive to transient changes in current flow through said series compensating winding, comprising a current path connected in parallel to said compensating winding and having a value of inductance substantially different from that of said compensating winding, whereby steady and transient currents will divide between the two paths in unlike ratios.

4. A direct current dynamo electric machine of the type provided with an armature wound with coils and provided with commutator and brushes, a laminated field structure presenting poles and having conductor receiving slots arranged uniformly and continuously therearound, main polar windings and a series compensating winding wound in the slots of said laminated field structure, the m. m. f. of the compensating winding opposing the armature m. m. f., and the respective axes of these two windings being 90 electrical degrees apart, wherein the span of the armature coils is shorter than normal so as to give a substantially flat topped armature m. m. f. characteristic, the inner turns of the compensating winding, at the mid-points of the interpolar spaces are wound in adjacent slots, and the outer turns span approximately 180 electrical degrees, so as to give a peaked form to the compensating m. m. f., the relative size of these turns of the compensating winding being so chosen that the difference in m. m. f. between said peak and the substantially flattened top of the armature m. m. f. is sufficient to produce the reversing flux necessary for commutation, without any necessity of over-compensation, also including control means responsive to steady current changes, including at each brush station two relatively narrower brushes, insulated from each other and spanning the same angular distance as a normal single brush, and an ancillary winding around a main pole and connected between said narrower brushes, whereby the armature coil momentarily connected to said two brushes will feed current to said ancillary winding, so as to alter the total pole flux.

5. A dynamo electric machine according to claim 4, including connections from the leads carrying the main current of the machine are connected to the mid-points of the opposite ancillary windings.

6. A dynamo electric machine according to claim 1, wherein the outer conductors of the main polar windings span less than 180 electrical degrees, whereby to leave commutating zones opposite the brushes.

7. A direct current dynamo electric machine of the type provided with an armature wound with coils and provided with commutator and brushes, a laminated field structure presenting poles and having conductor receiving slots arranged uniformly and continuously therearound, main polar windings and a series compensating winding wound in the slots of said laminated field structure, the m. m. f. of the compensating winding opposing the armature m. m. f., and the respective axes of these two windings being 90 electrical degrees apart, wherein the span of the armature coils is shorter than normal so as to give a substantially flat topped armature m. m. f. characteristic, the inner turns of the compensating winding, at the mid-points of the interpolar spaces are wound in adjacent slots, and the outer turns span approximately 180 electrical degrees, so as to give a peaked form to the compensating m. m. f., the relative size of these turns of the compensating winding being so chosen that the difference in m. m. f. between said peak and the substantially flattened top of the armature m.m.f. is sufficient to produce the reversing flux necessary for commutation, without any necessity of over-compensation, also including an external control circuit, generating means driven by said dynamo electric machine for feeding back said control circuit, and means for feeding transient variations of current in said control circuit back to said machine, so as to cause a change in flux acting on the armature coils in the commutating zone and short circuited by the brushes, thereby quickly altering the current in said coils, which in turn alters the flux in the main field axis of the machine in response to said variations.

8. A dynamo electric machine according to claim 7, in which said feed back means include a transformer connected on the primary side to said control circuit, and an ancillary interpole coil connected to the secondary side of said transformer.

9. A dynamo electric machine according to claim 7, including two ancillary interpole coils, means for feeding said variations in current to one of said interpole coils, and means for feeding a current of very much smaller variation to the other of said interpole coils.

JAS. C. MACFARLANE.
    WILLIAM IAN MACFARLANE.

REFERENCES CITED

The following references are of record in the file of this patent:

UNITED STATES PATENTS

| Number | Name | Date |
|---|---|---|
| 1,215,786 | Fahrmbacher | Feb. 13, 1917 |
| 1,287,190 | Bergman | Dec. 10, 1918 |
| 1,454,925 | Hellmund | May 15, 1923 |
| 1,595,737 | Shand | Aug. 10, 1926 |
| 1,630,390 | Krauss | May 31, 1927 |
| 1,719,905 | Schombourger | July 9, 1929 |
| 1,756,867 | Konn | Apr. 29, 1930 |
| 2,166,187 | Stivender | July 18, 1939 |
| 2,288,408 | Lane | June 30, 1942 |
| 2,310,131 | Tofflinger | Feb. 2, 1943 |
| 2,324,319 | Page | July 13, 1943 |
| 2,427,574 | Phillips | Sept. 16, 1947 |
| 2,483,146 | Merrill | Sept. 27, 1949 |